(12) United States Patent
Meacham et al.

(10) Patent No.: US 9,382,812 B2
(45) Date of Patent: Jul. 5, 2016

(54) ANISOTROPIC BEARING SUPPORTS FOR TURBOCHARGERS

(71) Applicant: HONEYWELL INTERNATIONAL INC., Morristown, NJ (US)

(72) Inventors: Walter Lee Meacham, Phoenix, AZ (US); Kostandin Gjika, Epinal (FR); Mohsiul Alam, Chandler, AZ (US); Gerald D. LaRue, Torrance, CA (US)

(73) Assignee: Honeywell International Inc., Morris Plains, NJ (US)

( * ) Notice: Subject to any disclaimer, the term of this patent is extended or adjusted under 35 U.S.C. 154(b) by 124 days.

(21) Appl. No.: 14/280,614

(22) Filed: May 18, 2014

(65) Prior Publication Data

US 2014/0255157 A1    Sep. 11, 2014

Related U.S. Application Data

(62) Division of application No. 13/358,368, filed on Jan. 25, 2012, now Pat. No. 8,734,130, which is a division of application No. 11/930,841, filed on Oct. 31, 2007, now Pat. No. 8,118,570.

(51) Int. Cl.
| | |
|---|---|
| F04B 17/00 | (2006.01) |
| F01D 25/16 | (2006.01) |
| F02C 6/12 | (2006.01) |
| F16C 19/18 | (2006.01) |
| F16C 27/06 | (2006.01) |
| F16C 32/06 | (2006.01) |
| F16C 33/10 | (2006.01) |
| F16C 35/10 | (2006.01) |
| F16C 35/12 | (2006.01) |
| F16C 17/18 | (2006.01) |

(52) U.S. Cl.
CPC ............... *F01D 25/164* (2013.01); *F02C 6/12* (2013.01); *F16C 17/18* (2013.01); *F16C 19/184* (2013.01); *F16C 27/06* (2013.01); *F16C 32/06* (2013.01); *F16C 33/10* (2013.01); *F16C 35/10* (2013.01); *F16C 35/12* (2013.01); *F05D 2220/40* (2013.01); *F05D 2240/53* (2013.01); *F05D 2240/54* (2013.01); *F16C 2360/24* (2013.01); *Y10S 384/901* (2013.01)

(58) Field of Classification Search
USPC ............................... 385/99, 535; 384/99, 535
See application file for complete search history.

(56) References Cited

U.S. PATENT DOCUMENTS

| | | | | |
|---|---|---|---|---|
| 1,326,892 | A * | 12/1919 | Reynolds | F16C 23/084 384/495 |
| 4,668,108 | A * | 5/1987 | McHugh | F16C 27/00 384/215 |
| 4,708,602 | A * | 11/1987 | McEachern, Jr. | F01D 25/164 384/474 |
| 6,425,743 | B1 * | 7/2002 | Fischer | F02C 1/00 415/174.2 |
| 6,682,219 | B2 * | 1/2004 | Alam | F01D 25/164 384/581 |

(Continued)

Primary Examiner — Charles Freay
(74) Attorney, Agent, or Firm — Brian J. Pangrle

(57) ABSTRACT

A rotating assembly for a turbocharger can include a center housing that includes a through bore having a central axis; a bearing cartridge positioned in the through bore where the bearing cartridge includes an outer race, an inner race and rolling elements disposed between the inner race and the outer race; an anisotropic member positioned in the through bore between the outer race of the bearing cartridge and a surface of the center housing where the surface defines at least part of the through bore of the center housing; and a shaft rotatably supported in the center housing by the bearing cartridge where the inner race is mounted on the shaft and the shaft is connected at one end to a compressor wheel and at another end to a turbine wheel.

23 Claims, 19 Drawing Sheets

Exemplary Ball Bearing Assembly with Rings (open) 800

(56) References Cited

U.S. PATENT DOCUMENTS

| | | | | |
|---|---|---|---|---|
| 7,052,183 B2 * | 5/2006 | Chen | ................ | F16C 27/066 267/141.3 |
| 8,118,570 B2 * | 2/2012 | Meacham | ................ | F02C 6/12 384/119 |
| 8,734,130 B2 * | 5/2014 | Meacham | ................ | F02C 6/12 384/119 |
| 2005/0287018 A1 * | 12/2005 | Mavrosakis | ............ | F01D 25/16 417/407 |
| 2007/0134106 A1 * | 6/2007 | McKeirnan | ............. | F01D 25/16 417/407 |

* cited by examiner

Exemplary Assemblies 400

Fully-Floating Ring(s) Assembly 402

Anisotropic Static Structure
(see Assembly 500 of Fig. 5)

Anisotropic Ring Structure
(see Assembly 600 of Fig. 6)

Semi-Floating Ring(s) Assembly 404

Anisotropic Lobed Ring Support
(see Assembly 700 of Fig. 7,
Assembly 900 of Fig. 9,
Assembly 1000 of Fig. 10)

Anisotropic Spring Cage Support
(see Assembly 1300 of Fig. 13,
Assembly 1900 of Fig. 19)

Ball Bearing(s) Assembly 406

Anisotropic Lobed Ring Support
(see Assembly 800 of Fig. 8,
Assembly 1100 of Fig. 11)

Anisotropic Spring Cage Support
(see Assembly 1400 of Fig. 14,
Assembly 1500 of Fig. 15,
Assembly 1900 of Fig. 19)

Fig. 4

Exemplary Lobed Ring and Fully-Floating Assembly 600

ANISOTROPIC BEARING SUPPORTS FOR TURBOCHARGERS

RELATED APPLICATIONS

This application is a second divisional of U.S. patent application having Ser. No. 11/930,841, filed 31 Oct. 2007 (issued as U.S. Pat. No. 8,118,570 on 21 Feb. 2012), which is incorporated by reference herein, the first divisional, herewith, having Ser. No. 13/358,368, filed 25 Jan. 2012 (issued as U.S. Pat. No. 8,734,130 on 27 May 2014), which is incorporated by reference herein.

TECHNICAL FIELD

Subject matter disclosed herein relates generally to turbo-machinery for internal combustion engines and, in particular, bearings and components for use with bearings.

BACKGROUND

Turbo-machinery, in general, can experience non-synchronous vibration (NSV). NSV is usually associated with an unstable rotor-bearing system mode, however, in many cases, a limit cycle is reached, which limits the amplitude of NSV. Large amplitude or unbound NSV can result in excessive vibration/noise and/or destruction of the turbo-machinery. NSV which is low frequency (typically lower than the synchronous speed of the machine) can result in undesirable noise.

NSV can be the result of many design parameters. Control of these parameters is not always easy, and in some cases unavoidable due to basic design requirements of a particular turbo-machine. In many instances, NSV control is accomplished by modifying rotor supports or optimization of the supports, often at increased cost, complexity or reduced component tolerance. However, these efforts often do not fully suppress NSV.

Full suppression of NSV for turbochargers that must operate over a large range of speeds, temperatures and external loading is seldom achieved. Depending on design, a turbocharger rotor may be mounted using floating ring bearings or partial floating ring bearings, which have clearances that allow for rotor drop (e.g., due to gravity). A designer typically needs to balance: (i) bearing clearance for rotor stability (minimization of NSV), (ii) rotor clearances for performance and (iii) turbocharger operability. To balance these factors, the operating envelope of the bearings (clearances, oil temperature range, oil type) requires extensive testing to verify that NSV is controlled. However, testing cannot always account for minor changes in bearing clearance due to wear, which can lead to NSV on turbochargers.

Another drawback of conventional turbocharger bearing systems is the large amount of lubricant required for a semi-floating ring bearing supported by a squeeze film damper (SFD) or a ball bearing supported by a SFD (noting that for a fully-floating ring, a lubricant layer lubricates rotation of the ring with respect to a surrounding support structure). SFD systems typically have open mounts that increase lubricant supply requirements to achieve optimum performance. In an alternative "closed" mount approach, sealing and re-use of lubricant results in a reduction of the lubricant required by a turbocharger; which in turn allows for use of a smaller lubricant pump for the engine. Such an approach also leads to an overall reduction in parasitic losses—leading to higher performance vehicles which are more fuel efficient.

Overall, a need exists for bearing technologies that address issues like noise, wear and performance. Various exemplary bearing components and housings presented herein can address such issues.

SUMMARY

An exemplary anisotropic member supports a bearing in a bore and can reduce non-synchronous vibration (NSV) of the bearing in the bore. An exemplary anisotropic member includes an annular body configured to receive a bearing and to space the bearing a distance from a bore surface and is configured to impart anisotropic stiffness and damping terms to the bearing when positioned in the bore. Such a member is suitable for use in a rotating assembly for a turbocharger where the bearing may be a floating bearing, a semi-floating bearing or a ball bearing. Various exemplary members, bearings, housings, assemblies, etc., are disclosed.

BRIEF DESCRIPTION OF THE DRAWINGS

A more complete understanding of the various methods, devices, systems, arrangements, etc., described herein, and equivalents thereof, may be had by reference to the following detailed description when taken in conjunction with the accompanying drawings wherein:

FIG. 4 is a block diagram listing various exemplary assemblies that include one or more anisotropic features to reduce NSV.

DETAILED DESCRIPTION

Various exemplary methods, devices, systems, arrangements, etc., disclosed herein address issues related to technology associated with turbochargers and are optionally suitable for use with electrically assisted turbochargers, turbine generators and/or motorized compressors.

Figure 1:
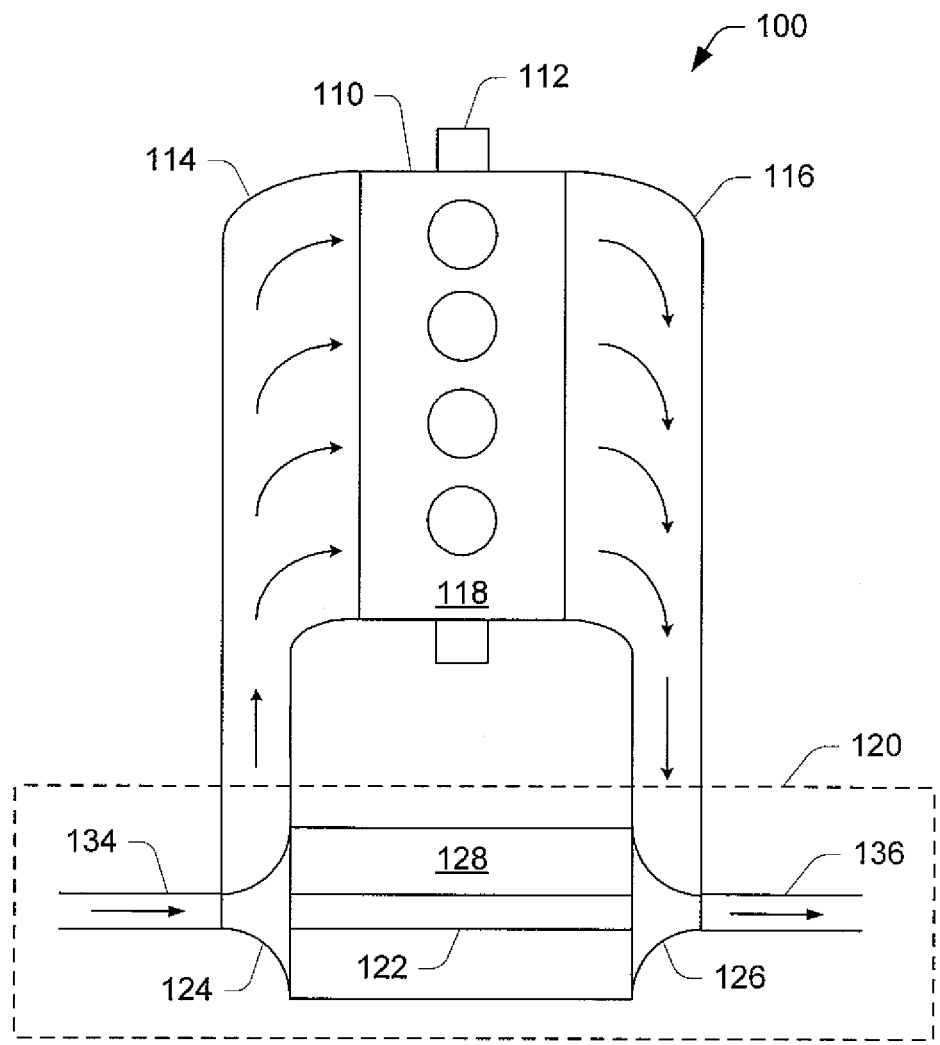
FIG. 1 is a diagram of a conventional internal combustion engine and turbocharger.

Turbochargers are frequently utilized to increase the output of an internal combustion engine. Referring to FIG. 1, a prior art system 100, including an internal combustion engine 110 and a turbocharger 120 is shown. The internal combustion engine 110 includes an engine block 118 housing one or more combustion chambers that operatively drive a shaft 112. As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which is combined with fuel to form combustion gas. As shown in FIG. 1, the turbocharger 120 includes an air inlet 134, a shaft 122, a compressor 124, a turbine 126, a housing 128 and an exhaust outlet 136. The housing 128 may be referred to as a center housing as it is disposed between the compressor 124 and the turbine 126. The shaft 122 may be a shaft assembly that includes a variety of components.

Referring to the turbine 126, such a turbine optionally includes a variable geometry unit and a variable geometry controller. The variable geometry unit and variable geometry controller optionally include features such as those associated with commercially available variable geometry turbochargers (VGTs). Commercially available VGTs include, for example, the GARRETT® VNT™ and AVNT™ turbochargers, which use multiple adjustable vanes to control the flow of exhaust across a turbine. A turbocharger may employ wastegate technology as an alternative or in addition to variable geometry technology.

Figure 2:
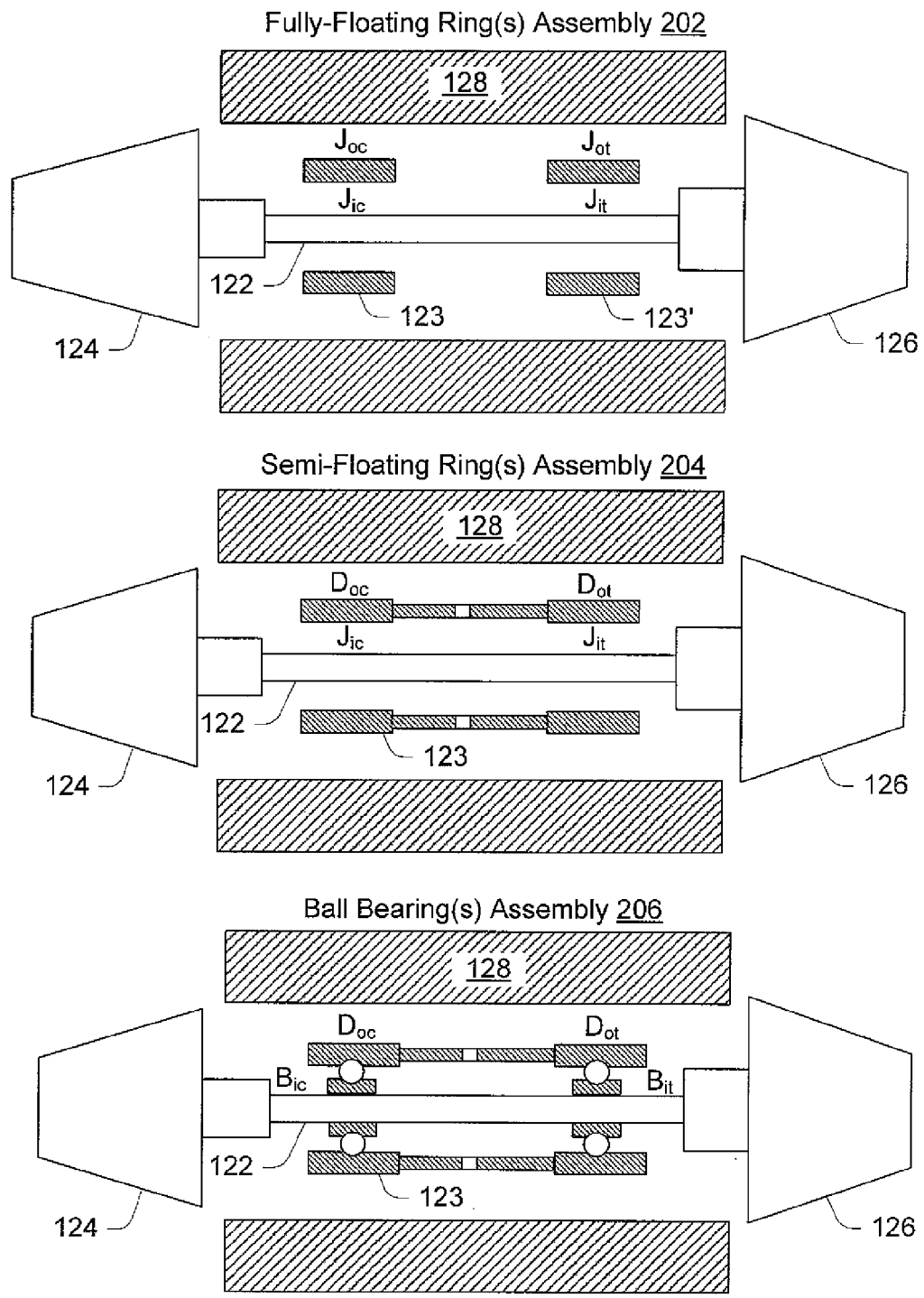
FIG. 2 is a series of diagrams for a conventional fully-floating rings assembly, a conventional semi-floating ring assembly, and a conventional ball bearing assembly.

FIG. 2 shows three different, conventional assembly arrangements for turbocharger rotor support: a fully-floating rings assembly 202, a semi-floating ring assembly 204 and a ball bearing assembly 206. Each assembly includes a compressor 124 and a turbine 126 connected by a shaft 122 supported within a static structure 128 (e.g., a center housing). An assembly may include additional rotating components for sealing the compartment ("closed" lubricant arrangement) or for reacting axial load.

The fully-floating rings assembly 202 includes a shaft 122 supported by a set of fully-floating journal bearings 123 (compressor side) and 123' (turbine side). In the assembly 202, each side has an outer journal ($J_o$) facing the static structure 128 and an inner journal ($J_i$) facing the shaft 122. Each fully-floating ring 123, 123' is supported by an outer lubricant layer and an inner lubricant layer and can rotate about the rotor axis (center-line) as well as move radially (e.g., off-center from the rotor axis). However, each ring 123, 123' is typically constrained from moving axially. In the arrangement 202, each bearing has a cross-coupling term with the other bearing; these terms, by definition, are not anisotropic.

In the semi-floating ring bearing assembly 204, a ring 123 is constrained from rotating about the rotor axis. For example, one or more pins may prevent or limit rotation of the ring 123. By limiting or constraining rotation, the outer hydraulic mount for the semi-floating ring 123 becomes a SFD (or SFDs) and the ring 123 is only able to whirl. The assembly 204 includes an inner compressor side journal ($J_{ic}$), an inner turbine side journal ($J_{it}$), an outer compressor side damper ($D_{oc}$) and an outer turbine side damper ($D_{ot}$).

For the assembly 204, the inner-journals have cross-coupling terms and are not anisotropic while the outer SFD(s) (e.g., $D_{oc}$ and $D_{ot}$) have no cross-coupling, however, the normal direction stiffness and damping are equal for center circular response and as such, are not anisotropic by design.

The assembly 206 includes "ball", or more generally, rolling element bearings ($B_{ic}$ and $B_{it}$) supported by outer SFDs (e.g., $D_{oc}$ and $D_{ot}$). As shown in FIG. 2, the assembly 206 includes a rotor 122 supported by a cartridge 123 that includes a set of roller bearings. The cartridge 123 is supported by at least a compressor end SFD ($D_{oc}$) and a turbine end SFD ($D_{ot}$). The outer race of the bearing cartridge 123 is similar the semi-floating ring; it can whirl about the rotor centerline but it cannot rotate about the bearing centerline. This results in the outer-hydraulic mount being SFD. For the assembly 206, the rolling element bearings are isotropic as is the compressor side SFD and the turbine side SFD (no cross-coupling terms and the normal terms are equal). Such rotor-bearing systems (RBS) are generally designed without a centering mechanism and without anisotropic support characteristics.

Figure 3A:
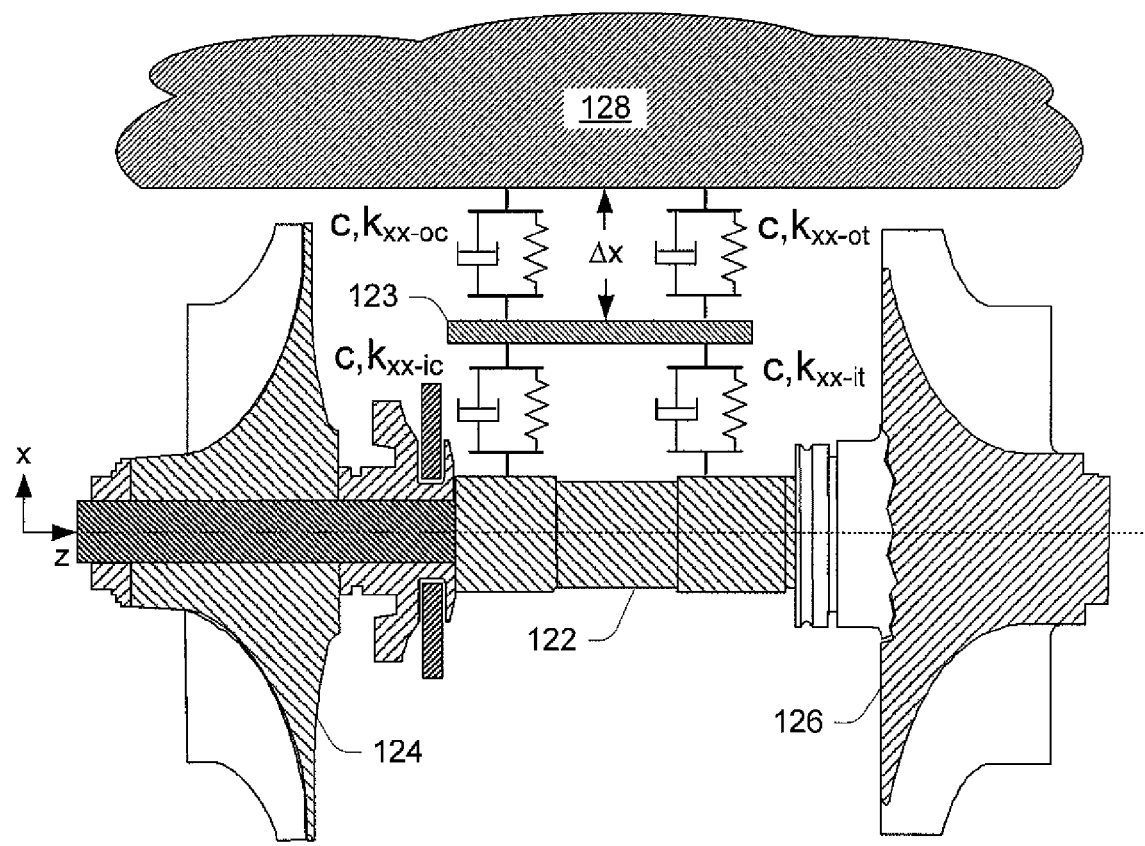
FIG. 3A is a cross-sectional view of a conventional assembly that includes a bearing positioned in a center housing of a turbocharger.
Figure 3B:
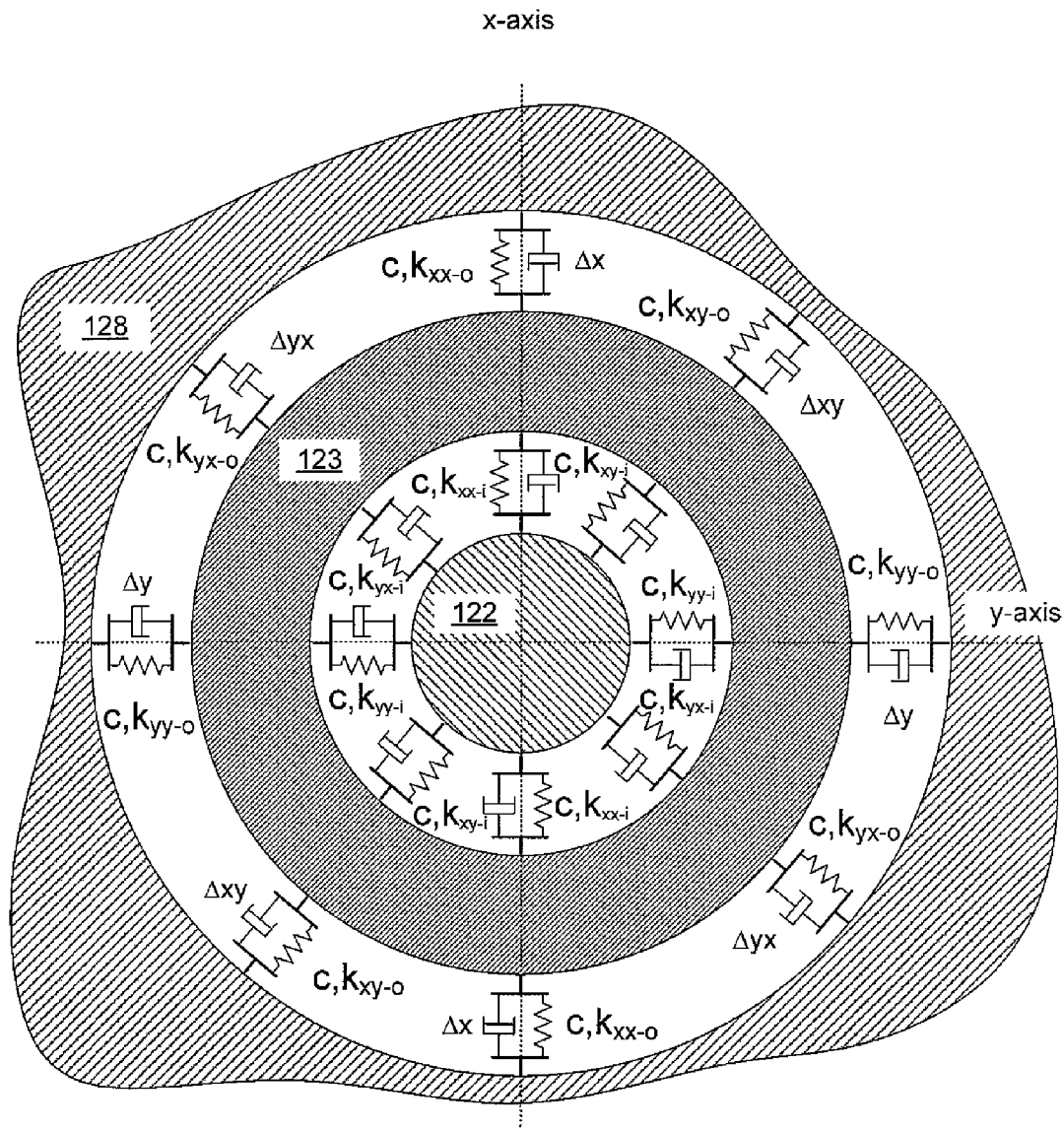
FIG. 3B is a cross-sectional view of the conventional assembly of FIG. 3A.

FIGS. 3A and 3B show two different cross-sectional views of an assembly where a compressor side bearing and a turbine side bearing are represented by a series of normal stiffness (k) and damping (c) terms as well as cross-coupling terms. FIG. 3A shows a rotor assembly that includes a compressor 124 and a turbine 126 coupled to a shaft 122. A ring 123 (or rings) supports the shaft 122 in the static structure 128 (e.g., a center housing).

A coordinate system is defined with the centerline (rotational axis) of the assembly along a z-axis and an x-axis perpendicular to the z-axis and aligned, for example, with gravity; a y-axis is defined as out of the page and perpendicular to the z-axis and the x-axis. FIG. 3B shows a cross-sectional view of the assembly in a xy-plane normal to the z-axis. Various terms "c,k" are defined with respect to the coordinate system and proximity to the compressor side or the turbine side of the assembly (e.g., $c,k_{xx-oc}$, $c,k_{xx-ic}$, $c,k_{xx-ot}$, $c,k_{xx-it}$, etc.). In both FIGS. 3A and 3B, the clearance between the ring 123 and the static structure 128 is designed to be approximately equal along the x-axis and along the y-axis (i.e., $\Delta x = \Delta y$). As shown in FIG. 3B, neglecting gravity, the outer terms (between the ring 123 and the static structure 128) are substantially equal and the inner terms (between the ring 123 and the shaft 122) are substantially equal.

As mentioned in the Background section, in a conventional assembly where the terms are substantially equal, NSV can occur. As described herein, an exemplary assembly includes anisotropy to suppress NSV.

FIG. 4 shows a chart of exemplary assemblies 400 that correspond to assemblies 500, 600, 700, 800, 900, 1000, 1100, 1300, 1400, 1500 and 1900 of FIGS. 5, 6, 7, 8, 9, 10, 11, 13, 14, 15 and 19 respectively. The assemblies 400 are grouped as fully-floating 402, semi-floating 404 and ball bearing 406 (or other similar rotating element).

Figure 5:
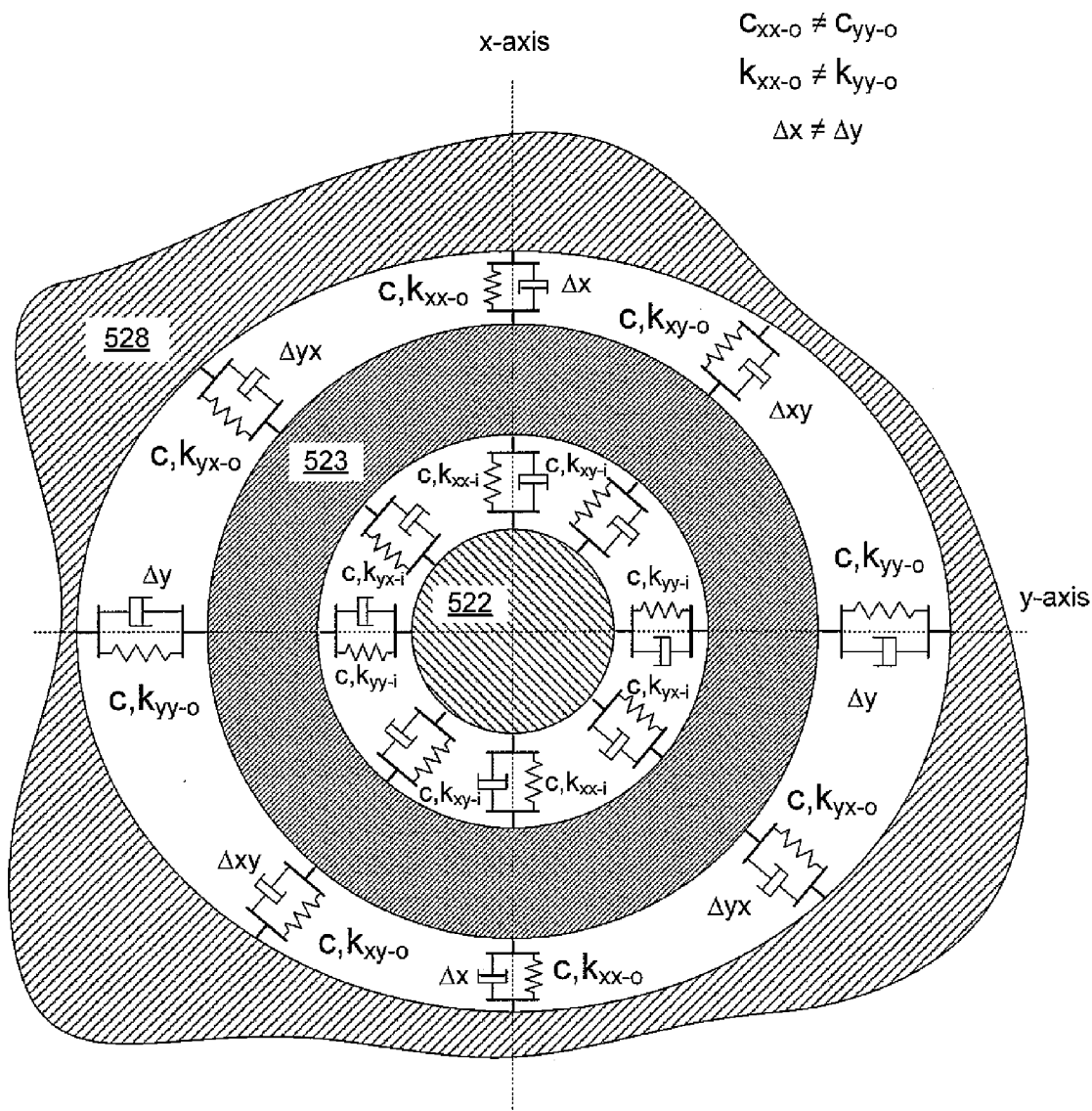
FIG. 5 is a cross-sectional view of an exemplary fully-floating assembly that includes an anisotropic static structure (e.g., an anisotropic center housing bore).
Figure 6:
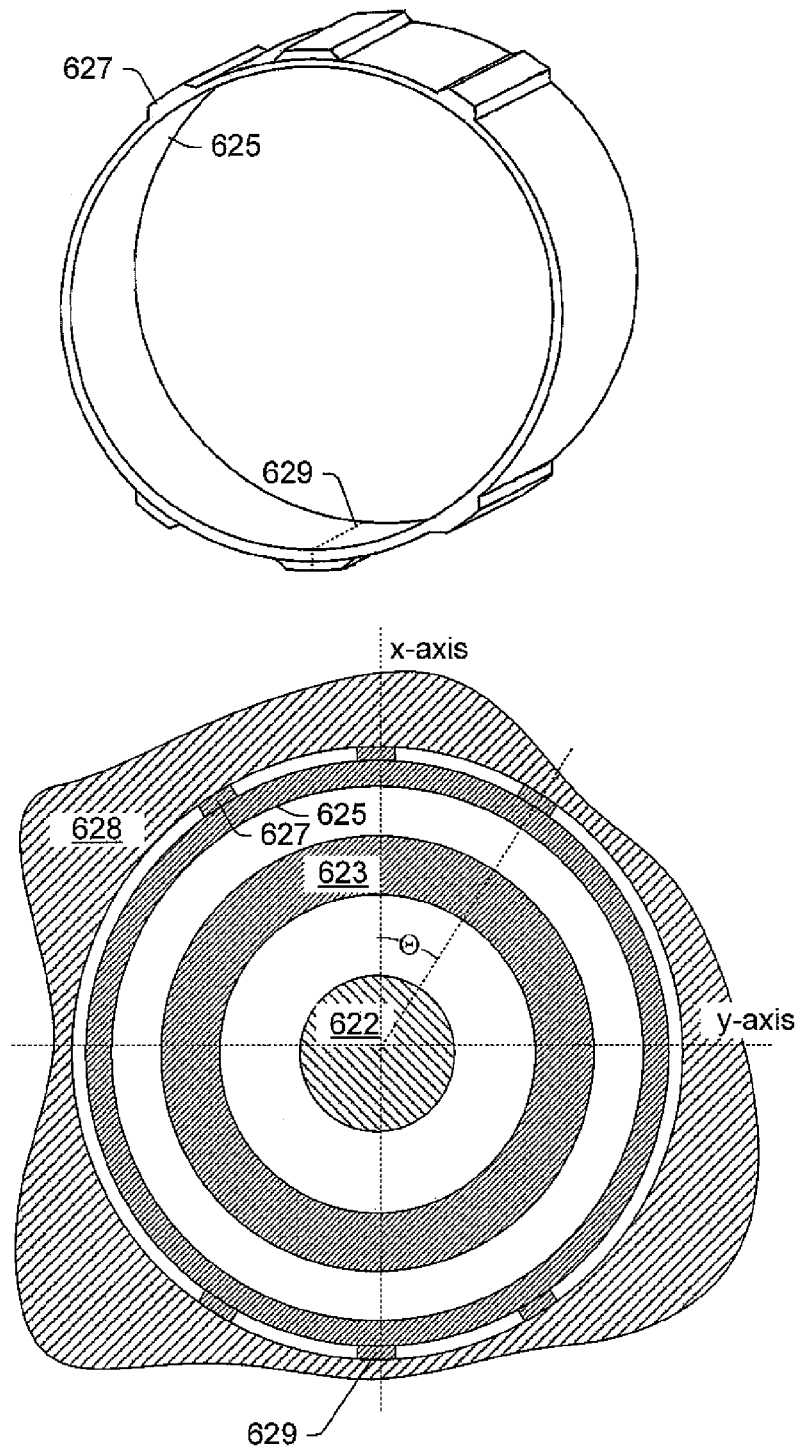
FIG. 6 is a perspective view of an anisotropic structure and a cross-sectional view of an exemplary fully-floating assembly that includes the anisotropic structure positioned within a bore (e.g., a center housing bore).

The fully-floating rings assembly 402 may be anisotropic by introduction of anisotropy in a static structure (see assembly 500 of FIG. 5) and/or by introduction of anisotropy in a ring structure (see assembly 600 of FIG. 6). The semi-floating ring assembly 404 may be an assembly made anisotropic by introduction of anisotropy in a ring structure (see assembly 700 of FIG. 7, assembly 900 of FIG. 9 and assembly 1000 of FIG. 10) or it may be an assembly made anisotropic by introduction of an anisotropic cage (see assembly 1300 of FIG. 13 and assembly 1900 of FIG. 19). The ball bearing assembly 406 may be an assembly made anisotropic by introduction of anisotropy in a ring structure (see assembly 800 of FIG. 8 and assembly 1100 of FIG. 11) or it may be an assembly made anisotropic by introduction of an anisotropic cage (see assembly 1400 of FIG. 14, assembly 1500 of FIG. 15 and assembly 1900 of FIG. 19).

While the assemblies of FIG. 3 show both a compressor and a turbine, in other examples, an anisotropic structure may be used with a half assembly, i.e., an assembly with a compressor only or a turbine only. In addition, an anisotropic structure may be used with a motorized turbocharger, a motorized compressor and/or a turbine coupled to a generator. In addition, one of the assemblies of FIG. 3 might include only a compressor bearing supported by an anisotropic member or only a turbine bearing supported by an anisotropic member. In such examples, the other bearing (or bearings) case could be unsupported or supported by an isotropic support.

FIG. 5 shows a cross-sectional view of an assembly 500 with an anisotropic static structure 528. The cross-sectional view may be at a position along the z-axis at the compressor side, at the turbine side or at a point between the compressor side and the turbine side of the assembly 500. The static structure 528 can be a center housing with an anisotropic bore. For example, a center housing bore with an elliptical cross-section is anisotropic with respect to a ring with a circular cross-section.

The assembly 500 includes a conventional ring 523 and a conventional shaft 522 positioned in the static structure 528. The ring 523 can rotate about the centerline (i.e., z-axis) as supported by an outer lubricant layer between the ring 523 and the static structure 528 and an inner lubricant layer between the ring 523 and the shaft 522. As indicated, the outer layer term $k_{xx-o}$ is not equal to the outer layer term $k_{yy-o}$, the outer layer term $c_{xx-o}$ is not equal to the outer layer term $c_{yy-o}$ and the clearance $\Delta x$ between the ring 523 and the static structure 528 is not equal to the clearance $\Delta y$ between the ring 523 and the static structure 528; hence, the assembly 500 is anisotropic with respect to the outer layer that supports the ring 523 and the shaft 522. This type of anisotropy acts to suppress NSV and enhance rotor stability. More specifically, the ring 523 rotates in an anisotropic lubricant space that suppresses NSV that would occur in an isotropic lubricant space.

According to the fully-floating rotating ring example of FIG. 5, an anisotropic support is one in which the stiffness and damping terms are designed such that c, $k_{yy}$ are not equal to c, $k_{xx}$ and where the cross coupling terms are approximately zero (c, $k_{yx}$, c, $k_{xy}$=0).

As described herein, for a substantially non-rotating support as found in a semi-floating assembly and a ball bearing assembly, an outer journal and/or a center housing bore can be machined such that a clearance in one direction (e.g., vertical) differs from a clearance in another direction (e.g., horizontal).

In the examples of FIG. 6 through FIG. 19, anisotropy is introduced by an anisotropic support member positioned in a static structure bore, which may be a substantially isotropic bore. In general, an anisotropic support member does not rotate to any significant degree and hence rotational dynamics of such an anisotropic support is not an important design consideration. Further, lubricant management features such as piston rings can reduce turbocharger lubricant flow requirements. Various features can be incorporated individually or in conjunction.

FIG. 6 shows an exemplary fully-floating assembly 600 that includes an anisotropic support structure 625 positioned between a ring 623 and a static structure 628. In this example, the anisotropic structure 625 affects interactions between the outer journal surface of the ring 623 and the static structure 628. The anisotropic structure 625 includes a series of spacers 627 that are positioned at various angles ($\Theta$) about the centerline (z-axis) to generate some amount of asymmetry. Where the anisotropic support 625 is resilient, the spacers 627 alter the stiffness terms for the outer journal surface of the ring 623. The anisotropic structure 625 optionally includes a split 629 to facilitate assembly. For example, the ring structure 625 can be opened at the split 629 and positioned around a bearing (e.g., the ring 623).

The anisotropic support structure 625 can be a lobed spring that biases the static structure 628. While the anisotropic support structure 625 has a generally isotropic shape, except for the spacers 627, the structure 625 can have an anisotropic shape that acts to reduce NSV.

While a center housing bore for a turbocharger may have some anisotropy, such anisotropy is typically for lubricant drainage, ease of assembly, etc., and not to control NSV. As described herein, particular components of a center housing for a turbocharger can include anisotropic features that reduce NSV. For example, various examples pertain to bearing supports that include anisotropic characteristics to control NSV.

Figure 7:
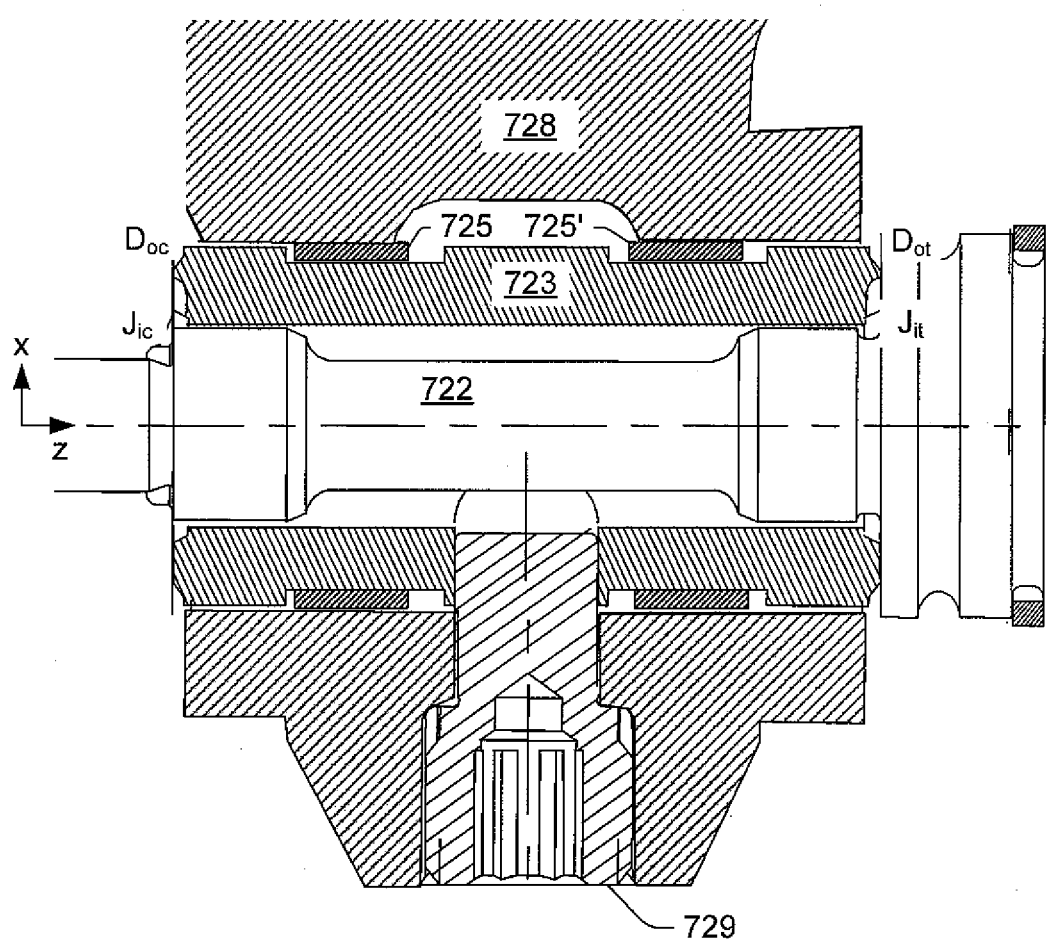
FIG. 7 is a cross-sectional view of an exemplary semi-floating assembly that includes a pair of anisotropic structures positioned within a bore (e.g., a center housing bore) to center a bearing in the bore.

FIG. 7 shows a semi-floating assembly 700 that includes two anisotropic support members 725, 725' positioned between a semi-floating bearing 723 and a static structure 728. In this example, the static structure 728 is a center housing of a turbocharger that includes a bore and an aperture configured to accept a locating pin 729 that extends into the bore to axially locate and limit rotation of the bearing 723 about the centerline of the bore (e.g., z-axis). Clearance between the pin 729 and the bearing 723 allow the bearing 723 to move along the x-axis.

The bearing 723 includes an outer, compressor side film damper surface ($D_{oc}$) and an outer, turbine side film damper surface ($D_{ot}$) that define, with the bore of the static structure 723, an outer lubricant film thickness for a compressor side SFD and a turbine side SFD, respectively. Similarly, the shaft 722 includes an inner, compressor side journal surface ($J_{ic}$) and an inner, turbine side journal surface ($J_{it}$) that define, with the bore of bearing 723, an inner, compressor side lubricant film thickness and an inner, turbine side lubricant film thickness, respectively. Noting that the shaft 722 rotates at high speed with respect to the constrained semi-floating bearing 723; thus, the inner lubricant films experience much more shear than the outer SFDs. As the outer SFDs are not bound on the compressor side or the turbine side, lubricant flow to maintain the SFDs may be substantial. In other words, such an open configuration tends to be sensitive to lubricant flow and lubricant pressure.

The anisotropic support members 725, 725' can be springs (or act as springs) to bias and center the bearing 723 in the bore, which may reduce or eliminate bearing drop along the x-axis in instances where lubricant pressure falls (e.g., engine shut down). Such an arrangement can reduce bearing instabilities associated with fluctuations or gradients in lubricant pressure.

In general, the members 725, 725' are lobed or bump springs are used to center the ring 723. An anisotropic bump spring can include inner and/or outer lobes with uneven spacing, similar to the spacers 627 of the structure 625 of FIG. 6.

Figure 8:
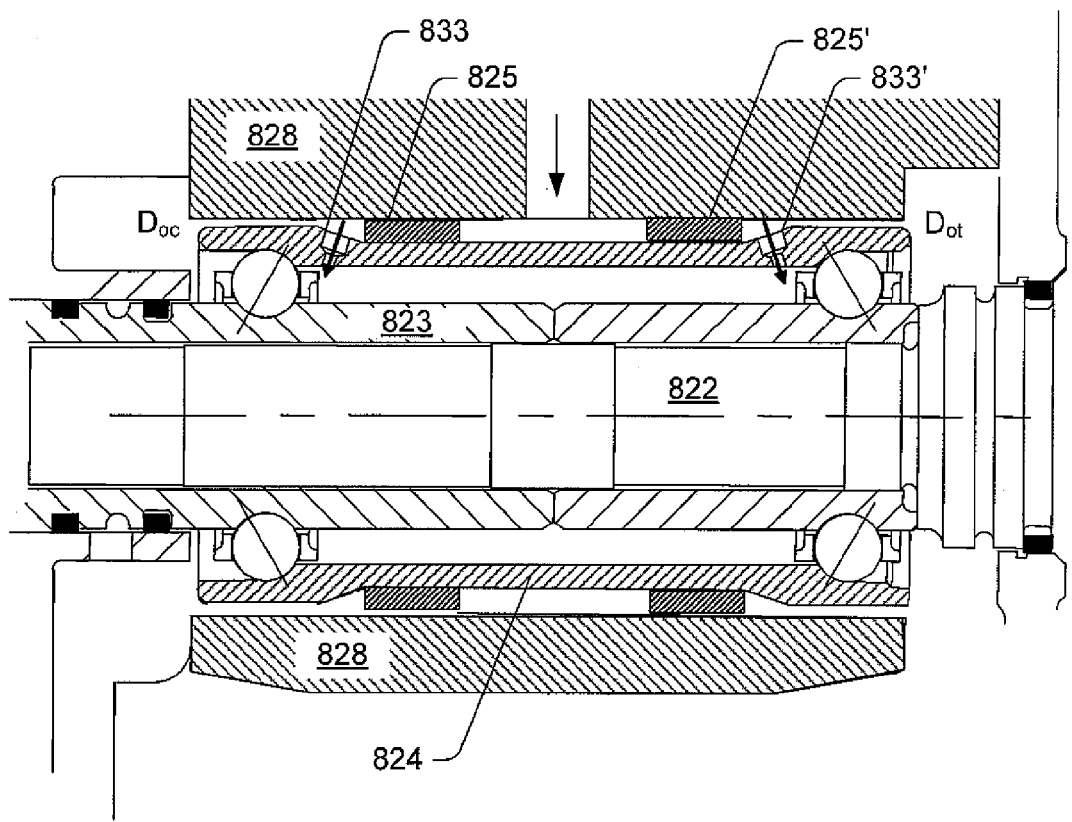
FIG. 8 is a cross-sectional view of an exemplary ball bearing assembly that includes a pair of anisotropic structures positioned within a bore (e.g., a center housing bore).

FIG. 8 shows a ball bearing assembly 800 that includes a pair of anisotropic centering springs 825, 825 for centering a bearing cartridge that includes a two piece inner race 823 and a unitary outer race 824. The compressor side SFD and the turbine side SFD are formed by damper surfaces $D_{oc}$ and $D_{ot}$ of the bearing outer race 824 and a bore surface of the static structure 828. The unitary outer race of the bearing cartridge 824 includes lubricant jet apertures 833, 833', which form part of the lubricant system.

Figure 9:
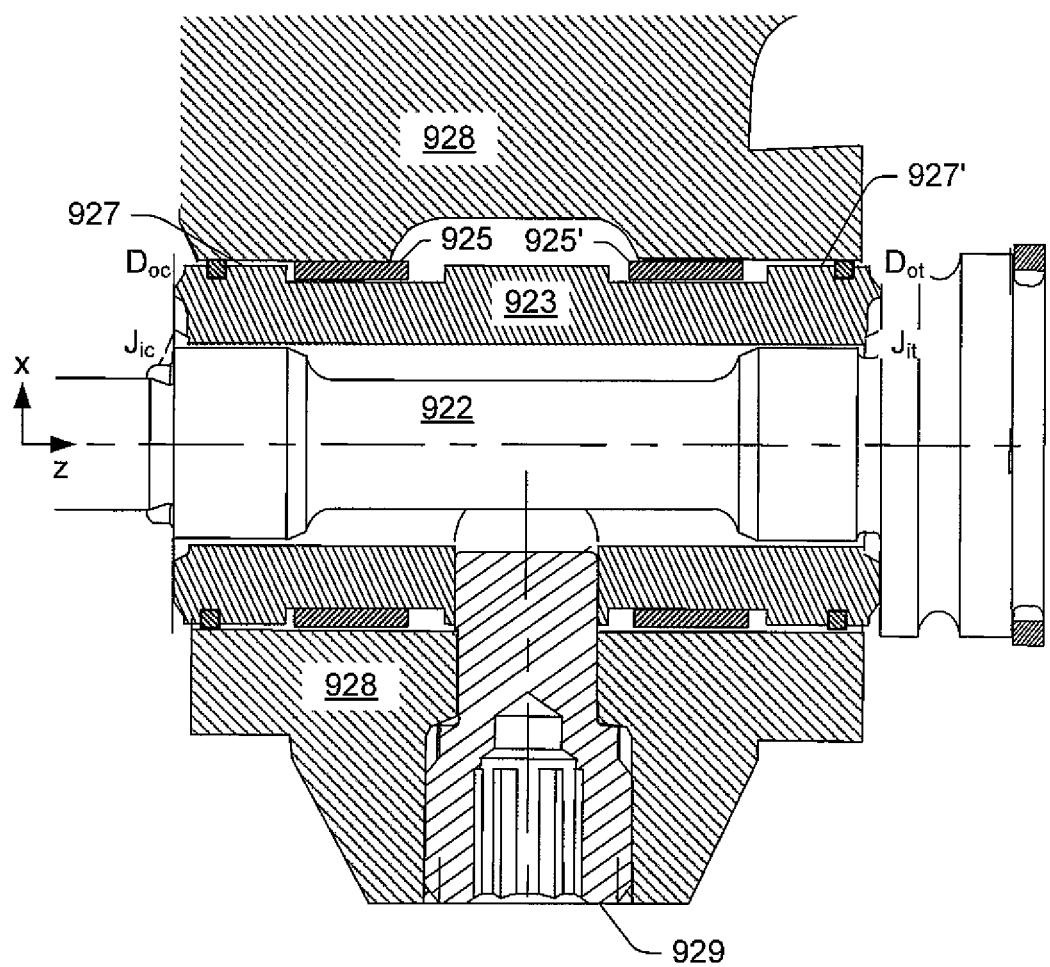
FIG. 9 is a cross-sectional view of an exemplary semi-floating assembly that includes a pair of anisotropic structures positioned within a bore (e.g., a center housing bore) to center a bearing in the bore and that includes a pair of piston rings to seal a compressor side SFD and a turbine side SFD.

FIG. 9 shows a semi-floating assembly 900 that includes a pair of anisotropic centering springs 925, 925' for centering a ring 923. In the example of FIG. 9, seal rings 927, 927' seal a compressor side SFD and a turbine side SFD, respectively. The seal rings 927, 927' can help to reduce lubricant requirements for the assembly 900. Further, each of the springs 925, 925' can help define a respective SFD boundary. Various other features are described with respect to the example of FIG. 8.

Figure 10:
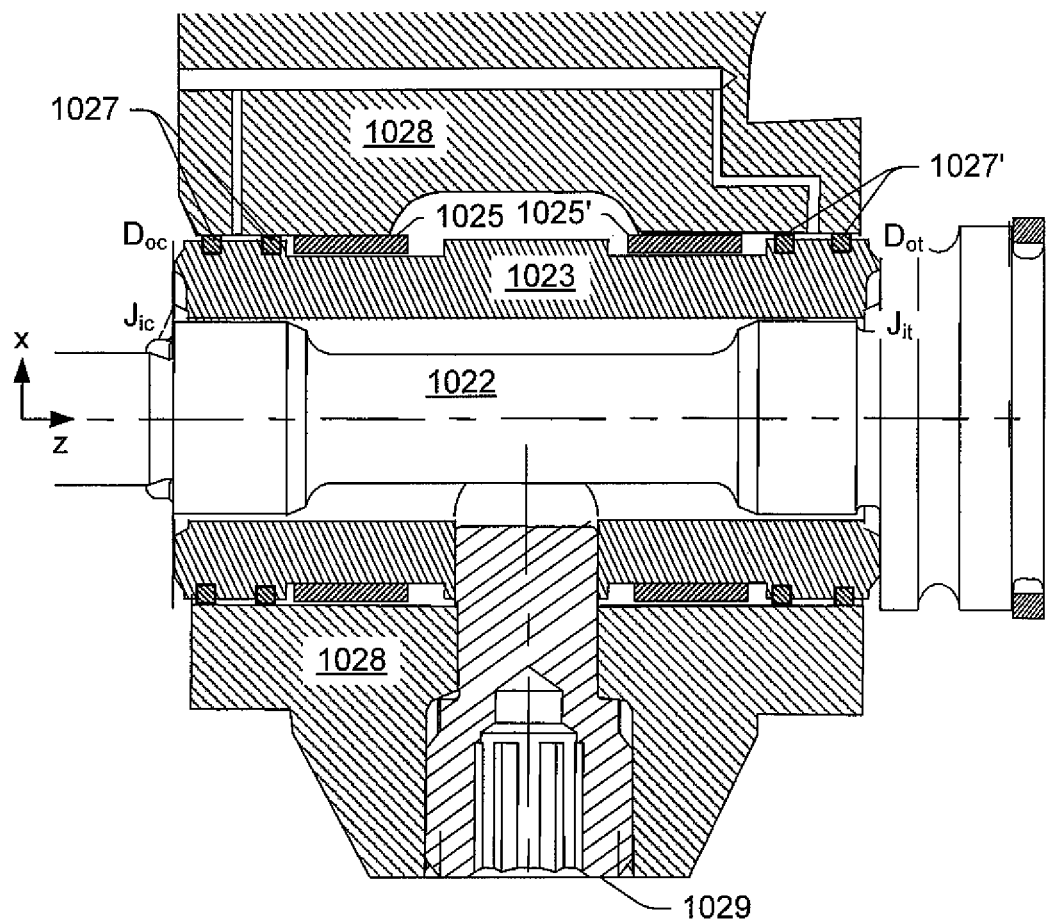
FIG. 10 is a cross-sectional view of an exemplary semi-floating assembly that includes a pair of anisotropic structures positioned within a bore (e.g., a center housing bore) to center a bearing in the bore and that includes two pairs of piston rings where one pair seals a compressor side SFD and another pair seals a turbine side SFD.

FIG. 10 shows an exemplary semi-floating assembly 1000 that includes a pair of anisotropic centering springs 1025, 1025' for centering a ring 1023. In the example of FIG. 10, a compressor side pair of seal rings 1027 seal a compressor side SFD and a turbine side pair of seal rings 1027' seal a turbine side SFD. The pairs of seal rings 1027, 1027' can help to reduce lubricant requirements for the assembly 1000. In the example of FIG. 10, lubricant paths exist in the static structure 1029 to deliver lubricant to the compressor side SFD and to the turbine side SFD. Various other features are described with respect to the example of FIG. 8.

Figure 11:
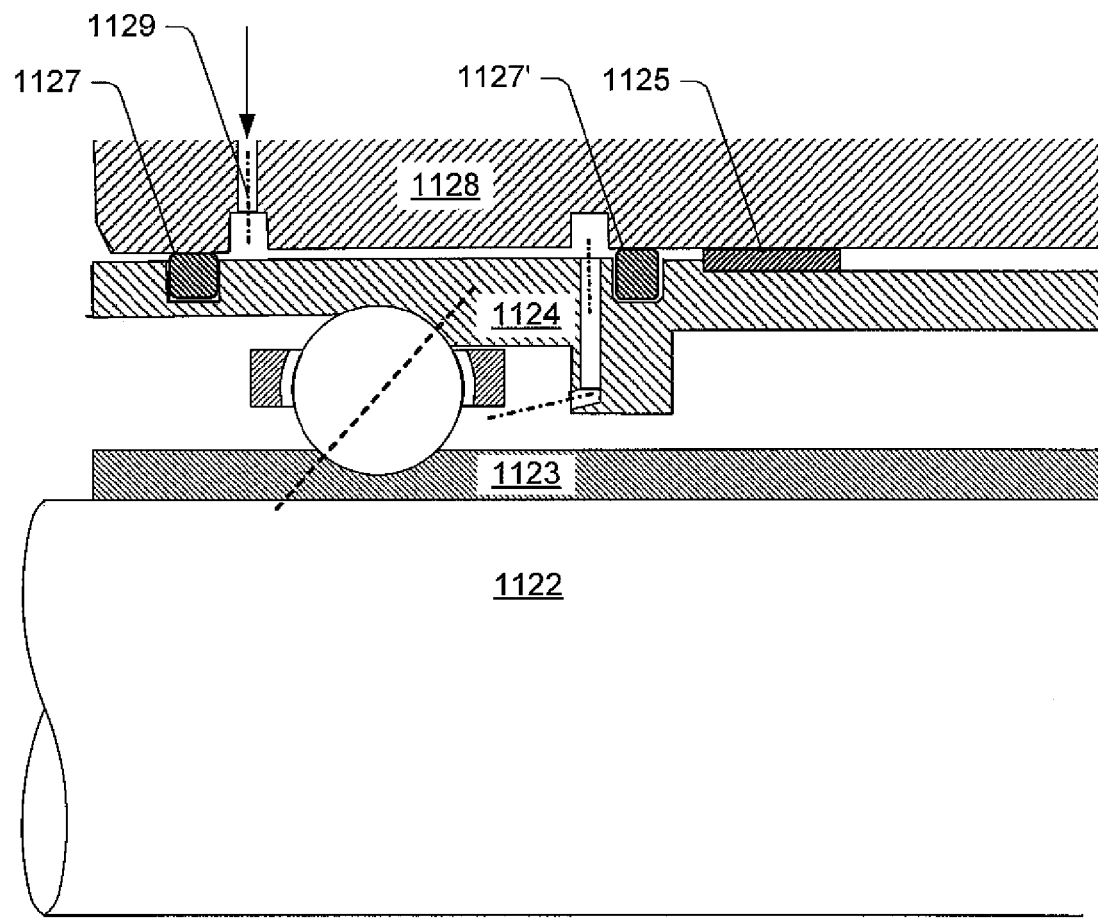
FIG. 11 is a cross-sectional view of an exemplary ball bearing assembly with an anisotropic structure and a pair of piston rings to seal a SFD.

FIG. 11 shows an exemplary ball bearing assembly 1100 that includes an anisotropic ring 1125. The ball bearing assembly 1100 includes a ball bearing that includes an inner race 1123 mounted on a shaft 1122 and an outer race 1124 that forms a SFD with a static structure 1128. The static structure 1128 includes a lubricant passage 1129 that delivers lubricant to the SFD where the SFD is defined in part by an outboard seal ring 1127 and an inboard seal ring 1127'.

Figure 12:
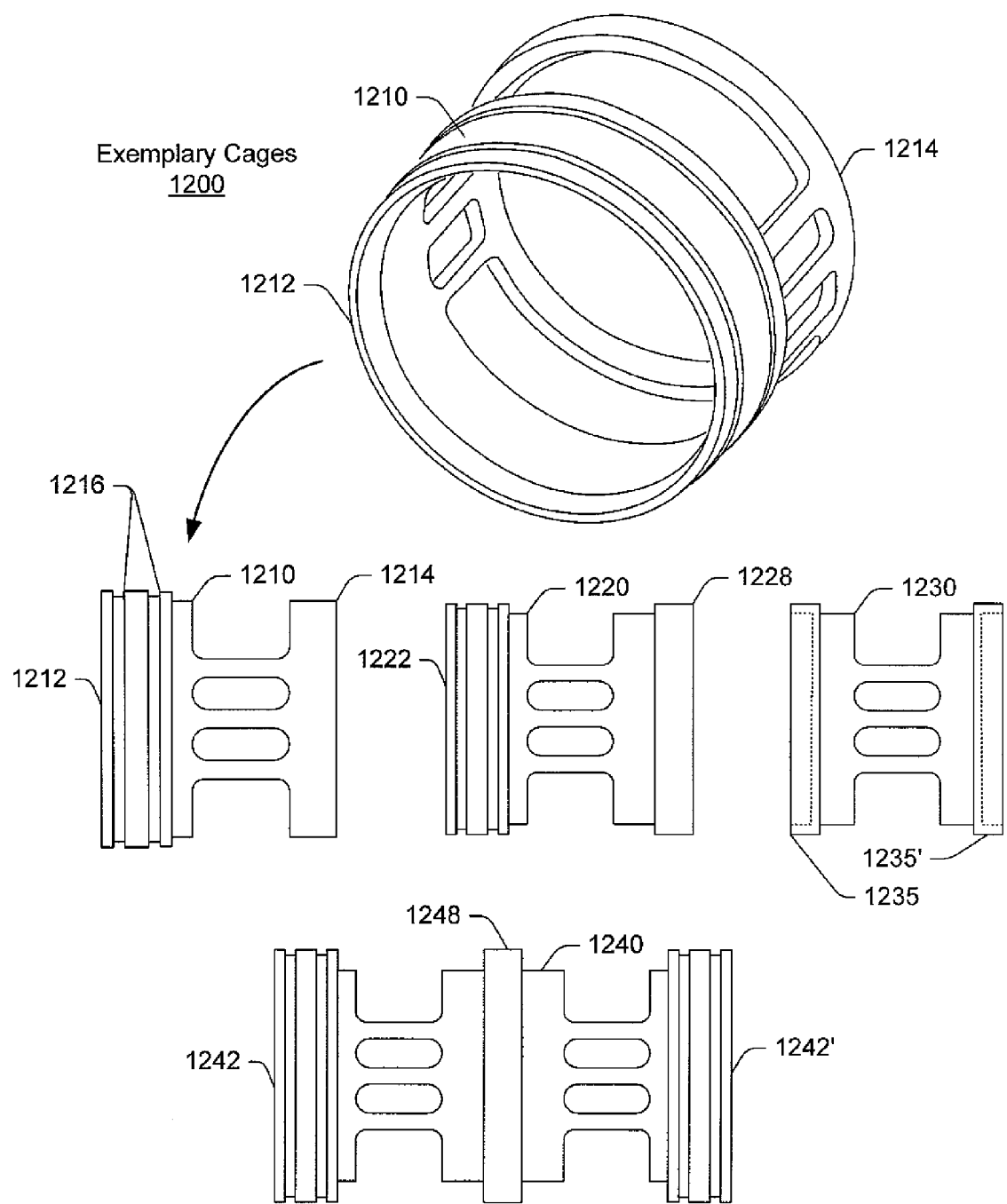
FIG. 12 is a perspective view of an exemplary anisotropic cage structure along with a side view of the cage and various side views of alternative cages.

FIG. 12 shows various exemplary anisotropic cages 1200. An exemplary cage 1210 includes an outboard end 1212 and an inboard end 1214. In this example, the outboard end 1212 includes one or more grooves or channels 1216 where each groove or channel can receive a seal ring.

In another example, an anisotropic cage 1220 includes an outboard end 1222 and an inboard end 1228 that can form an SFD with a static structure. In yet another example, an anisotropic cage 1230 includes symmetric ends 1235, 1235' that can receive, for example, respective bearings. In another example, an anisotropic cage 1240 includes two cage portions separated by a support portion 1248 where the cage has symmetric ends 1242, 1242'.

Figure 13:
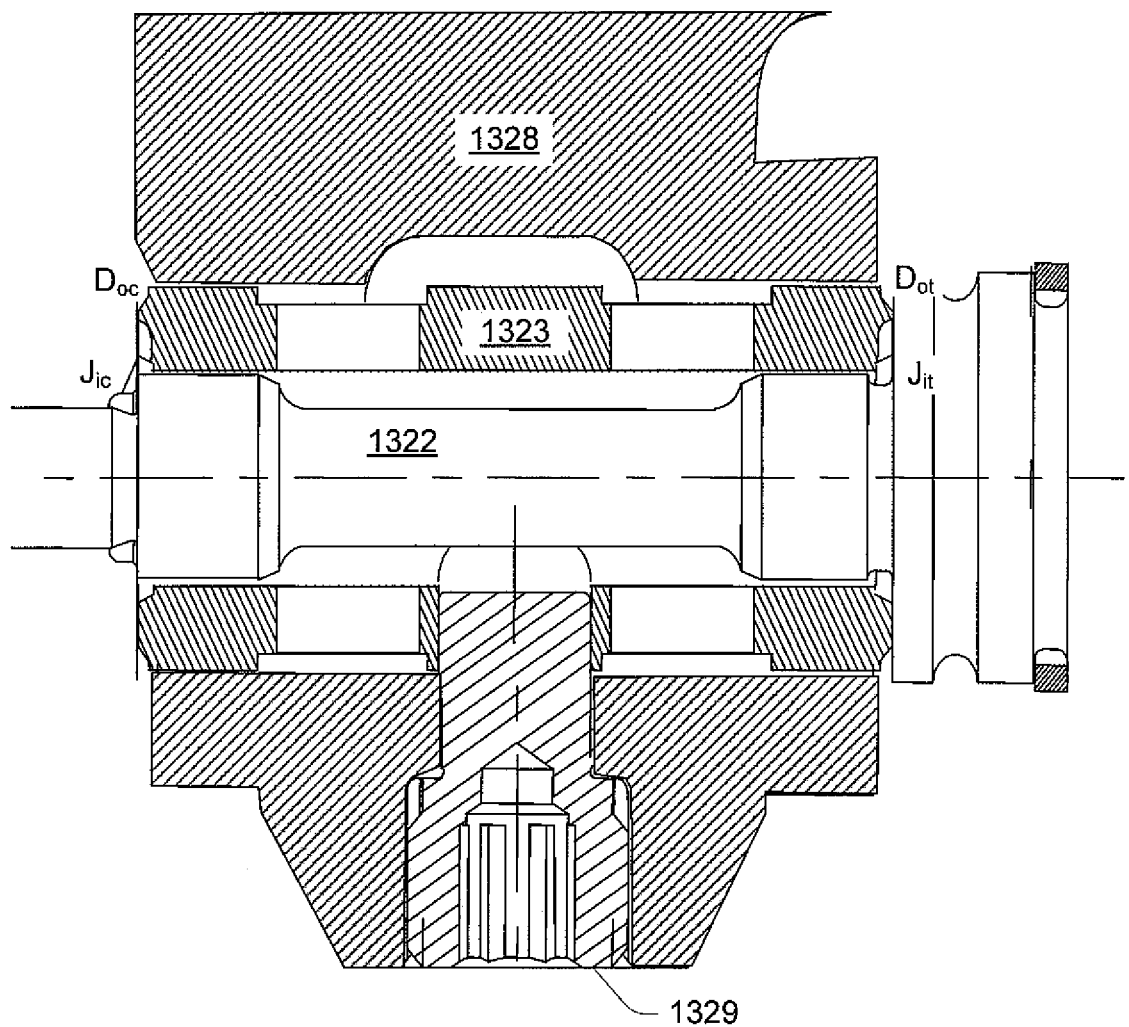
FIG. 13 is a cross-sectional view of an exemplary semi-floating assembly that includes an anisotropic cage.

FIG. 13 shows an exemplary semi-floating assembly 1300 with an anisotropic cage 1323 located in a static structure 1328 to support a shaft 1322. The anisotropic cage 1323 includes an inner compressor side journal surface $J_{ic}$, an inner turbine side journal surface $J_{it}$, an outer compressor side film damper surface $D_{oc}$ and an outer turbine side film damper surface $D_{ot}$. A pin 1329 locates the cage 1323 in the static structure 1328. The cage 1323 may have one or more features of one or more of the cages 1200 of FIG. 12. In particular, the cage 1323 includes an opening to receive the pin 1329 to limit rotation of the cage 1323 in the static structure 1328.

Figure 14:
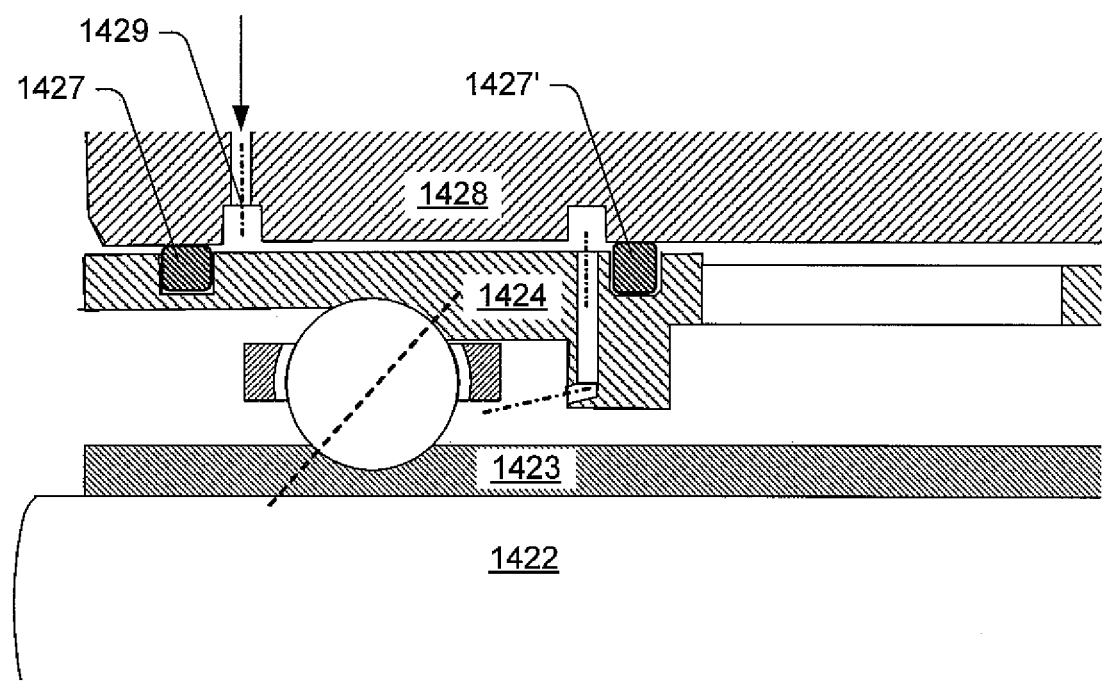
FIG. 14 is a cross-sectional view of an exemplary ball bearing assembly with an anisotropic cage along with a pair of piston rings that define a lubricant film region.

FIG. 14 shows an exemplary ball bearing assembly 1400 that includes an anisotropic cage 1424 that acts as an outer race. Hence, the ball bearing assembly 1400 includes a ball bearing that includes an inner race 1423 mounted on a shaft 1422 and an anisotropic cage outer race 1424 that forms a SFD with a static structure 1428. The static structure 1428 includes a lubricant passage 1429 that delivers lubricant to the SFD where the SFD is defined in part by an outboard seal ring 1427 and an inboard seal ring 1427'. The cage 1423 may have one or more features of one or more of the cages 1200 of FIG. 12.

Figure 15:
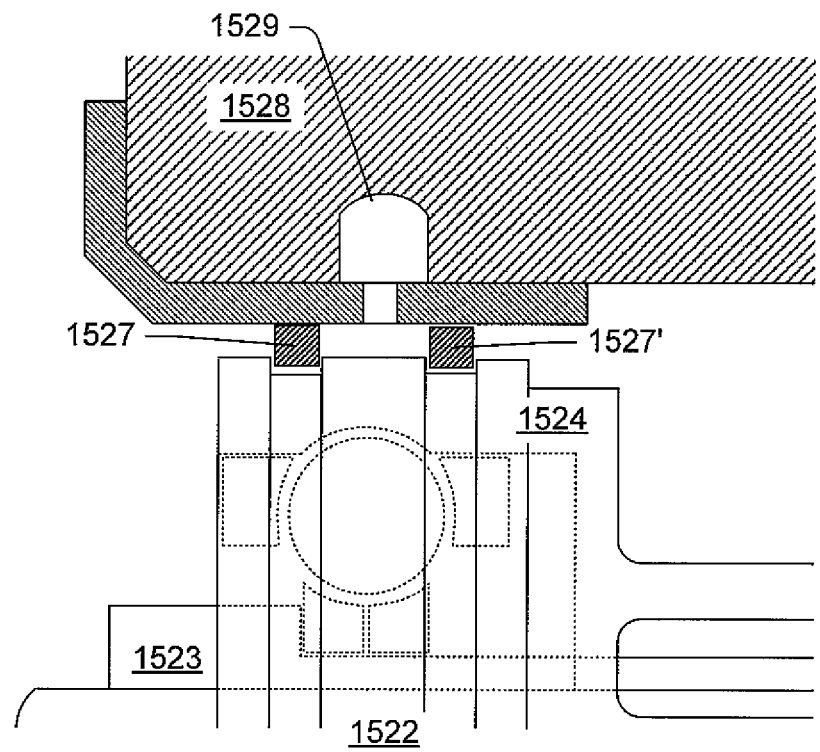
FIG. 15 is a cross-sectional view of an exemplary ball bearing assembly with an anisotropic cage that seats a pair of piston rings that define a lubricant film region.

FIG. 15 shows an exemplary ball bearing assembly 1500 that includes an anisotropic cage 1524 that acts as an outer race such as the cage 1230 of FIG. 12 (e.g., one half of the cage 1230). Hence, the ball bearing assembly 1500 includes a ball bearing that includes an inner race 1523 mounted on a shaft 1522 and an anisotropic cage outer race 1524 that forms a SFD with a static structure 1528. The static structure 1528 includes a lubricant passage 1529 that delivers lubricant to the SFD where the SFD is defined in part by an outboard seal ring 1527 and an inboard seal ring 1527'.

Figure 16:
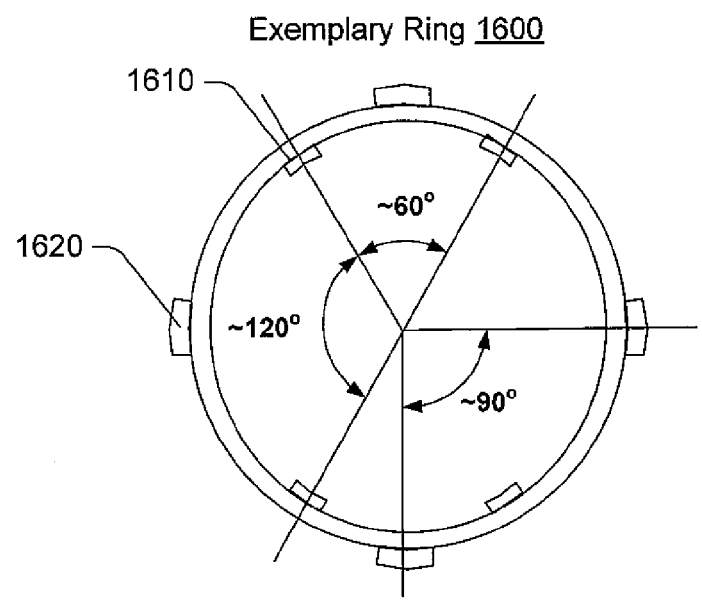
FIG. 16 is a plan view of an exemplary anisotropic structure that includes a plurality of segments.

FIG. 16 shows an exemplary anisotropic ring 1600 that includes a series of inner spacers 1610 and a series of outer spacers 1620. The spacers 1610, 1620 can create anisotropy in the ring 1600 by defining segments of different arc lengths. For example, the inner spacers 1610 define two segments of arc angle ~60° and two segments of arc angle ~120°. The outer spacers 1620 define four segments of arc angle ~90°. Additional anisotropy can be introduced by altering the position and/or number of outer spacers 1620. In general, different arc length segments will respond differently to force where a shorter arc length is stiffer than a longer arc length.

Figure 17:
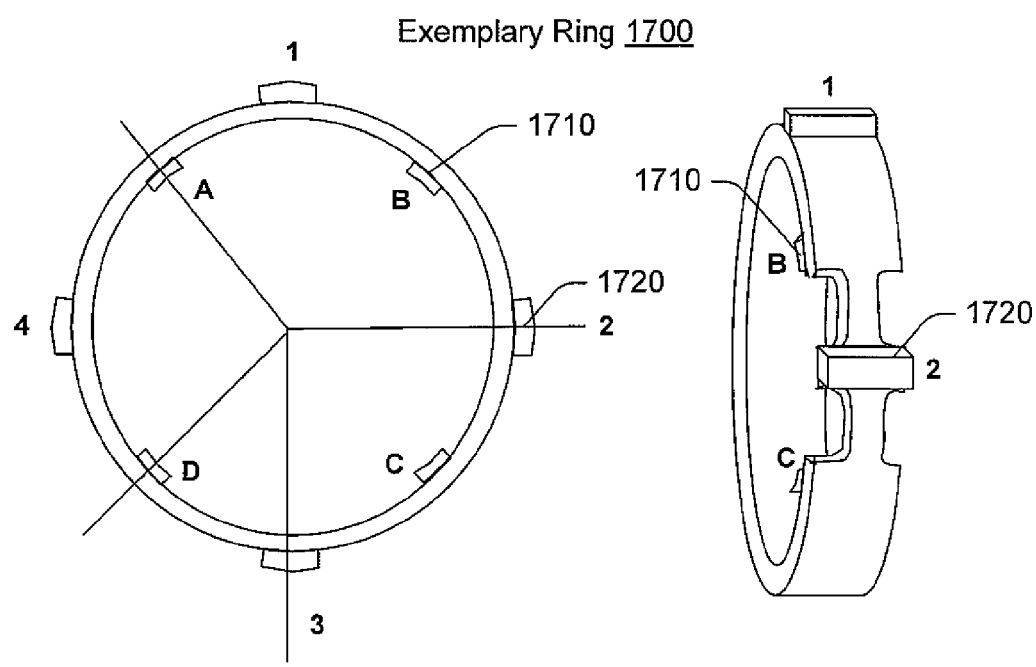
FIG. 17 is a plan view and a perspective view of an exemplary anisotropic structure that includes a plurality of segments where one or more segments differ in width (e.g., $\Delta z$).

FIG. 17 shows an exemplary anisotropic ring 1700 that includes a series of inner spacers 1710 and a series of outer spacers 1720. The spacers 1710, 1720 define segments of equal arc length. However, the width ($\Delta z$) varies for particular segments to create anisotropy. In general, different width segments will respond differently to force where a wider segment is stiffer than a narrower segment.

Figure 18:
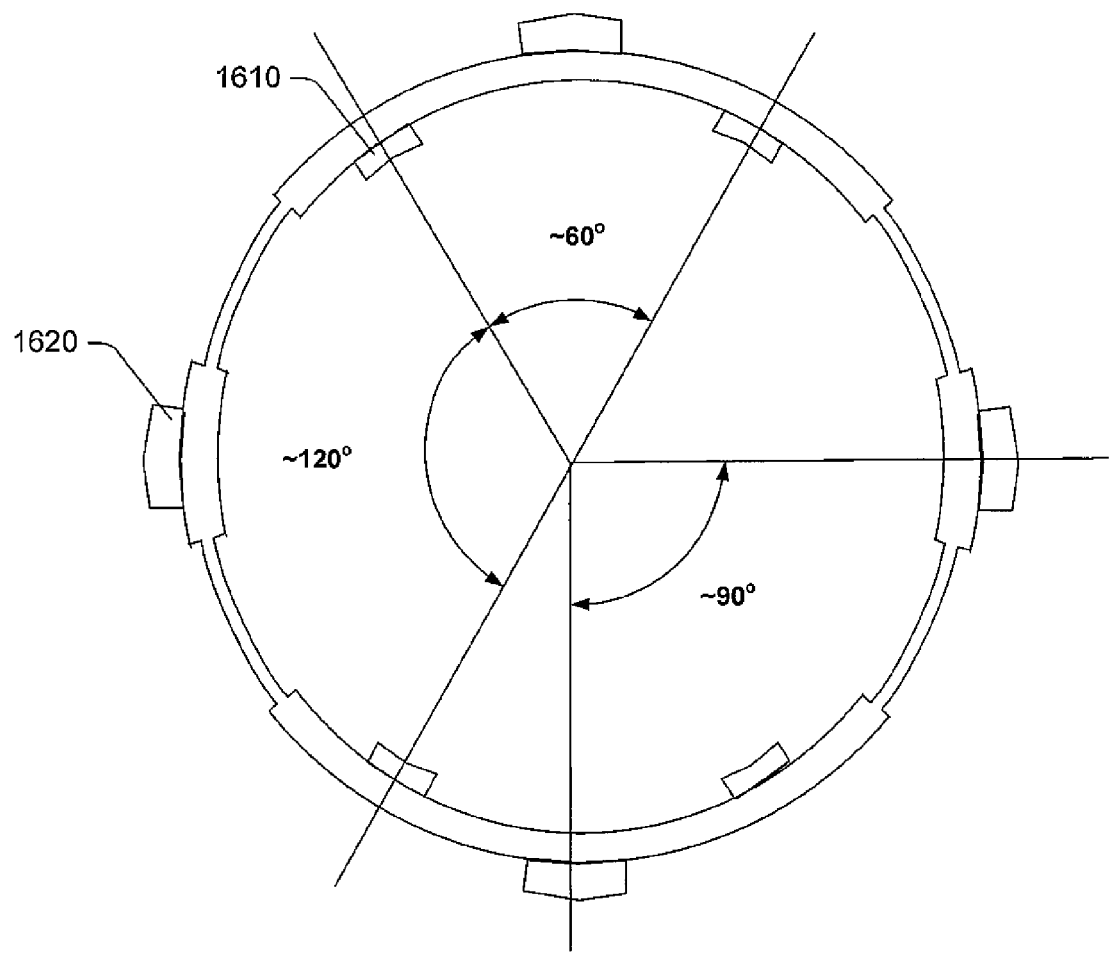
FIG. 18 is a plan view of an exemplary anisotropic structure that includes a plurality of segments where one or more segments differ in thickness (e.g., $\Delta r$).

FIG. 18 shows an exemplary anisotropic ring 1800 that includes a series of inner spacers 1810 and a series of outer spacers 1820. The spacers 1810, 1820 can create anisotropy in the ring 1800 by defining segments of different arc lengths. For example, the inner spacers 1810 define two segments of arc angle ~60° and two segments of arc angle ~120°. The outer spacers 1820 define four segments of arc angle ~90°. Additional anisotropy is introduced by differing segment thickness (e.g., $\Delta r$). In general, different segments will respond differently to force where a thicker segment is stiffer than a thinner segment. In addition, the ring 1800 can have anisotropy even though the arc angles between all of the spacers 1810 and 1820 are 45° because segments of the ring 1800 have differing segment thicknesses.

Figure 19:
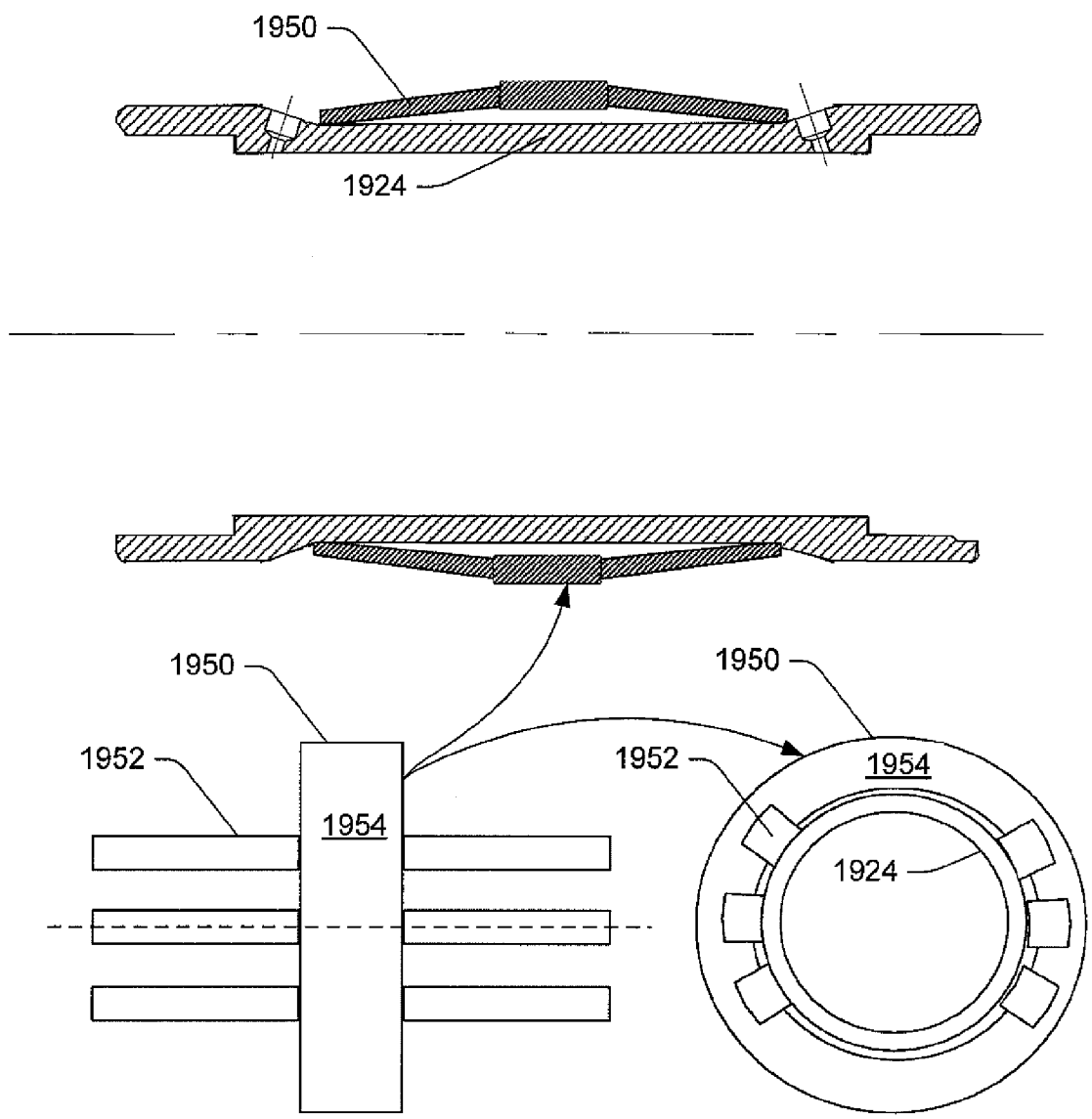
FIG. 19 is a cross-sectional view of an exemplary semi-floating or ball bearing assembly with an anisotropic cage.

FIG. 19 shows an exemplary semi-floating or ball bearing assembly 1900 with an anisotropic cage 1950. The cage 1950 is positioned with respect to a semi-floating ring or outer race 1924 to support the semi-floating ring or outer race 1924 in a static structure (not shown in FIG. 19). The cage 1950 includes legs 1952 that extend from a ring portion 1954 where the legs 1952 are arranged in a manner to make the cage anisotropic. In an alternative, the legs 1950 may be of different material, length, thickness, width, etc., to make the cage 1950 anisotropic. Further, the ring portion 1954 optionally includes one or more spacers to make the cage 1950 anisotropic. The ring portion 1950 optionally includes a split to allow for opening of the ring for ease of assembly with respect to a semi-floating ring or outer race.

Various other sealing methods and spring designs can reduce NSV and/or reduce lubricant requirements. The exemplary bearing features discussed herein can reduce design and development time. Such features can diminish bearing wear, which typically leads to NSV. Thus, NSV can be reduced or eliminated during the life cycle of an assembly. Reduction in the amount of lubricant required can increase overall system performance and operability.

As mentioned, various anisotropic members can be used with electrically assisted turbochargers. For example, a rotating assembly for a electrically assisted turbocharger can include a center housing that includes a through bore having a central axis, a pair of bearings positioned in the through bore, an anisotropic member positioned in the through bore between one bearing of the pair of bearings and a surface of the center housing where the surface defines at least part of the through bore of the center housing, a shaft, rotatably supported in the center housing by the pair of bearings, the shaft connected at one end to a compressor wheel and at another end to a turbine wheel and an electric motor configured to drive the shaft. Such an arrangement optionally includes another anisotropic member positioned in the through bore between the other bearing of the pair of bearings and a surface of the center housing where the surface defines at least part of the through bore of the center housing. In electric assist arrangements, an electric motor may function as a generator configured to generate electrical energy from exhaust energy.

Although some exemplary methods, devices, systems arrangements, etc., have been illustrated in the accompanying Drawings and described in the foregoing Detailed Description, it will be understood that the exemplary embodiments disclosed are not limiting, but are capable of numerous rearrangements, modifications and substitutions without departing from the spirit set forth and defined by the following claims.

What is claimed is:

1. A rotating assembly for a turbocharger comprising:
    a center housing that comprises a through bore having a central axis;
    a bearing cartridge positioned in the through bore wherein the bearing cartridge comprises an outer race, an inner race and rolling elements disposed between the inner race and the outer race;
    an anisotropic member positioned in the through bore between the outer race of the bearing cartridge and a surface of the center housing wherein the surface defines at least part of the through bore of the center housing and wherein the anisotropic member comprises a ring and a series of lobes arranged about the ring; and
    a shaft rotatably supported in the center housing by the bearing cartridge wherein the inner race is mounted on the shaft and the shaft is connected at one end to a compressor wheel and at another end to a turbine wheel.

2. The rotating assembly of claim 1 wherein the outer race of the bearing cartridge comprises a radial groove and a piston ring seated in the groove that forms a seal between the outer race of the bearing cartridge and a surface of the center housing wherein the surface defines at least part of the through bore.

3. The rotating assembly of claim 1 comprising two anisotropic members positioned in the through bore of the center housing.

4. The rotating assembly of claim 1 further comprising a locating pin for limiting rotation of the outer race of the bearing cartridge in the through bore.

5. The rotating assembly of claim 1 wherein the series of lobes of the anisotropic member impart anisotropic stiffness to the anisotropic member.

6. The rotating assembly of claim 1 wherein the series of lobes comprises lobes positioned at multiple angles about the central axis to generate one or more planes of reflection asymmetry.

7. The rotating assembly of claim 1 wherein the ring of the anisotropic member comprises a split ring.

8. The rotating assembly of claim 1 having an axis perpendicular to the central axis of the through bore of the center housing and wherein the series of lobes of the anisotropic member comprise an alignment with respect to the axis perpendicular to the central axis.

9. The rotating assembly of claim 8 wherein the axis perpendicular to the central axis is aligned with gravity.

10. The rotating assembly of claim 1 wherein the outer race of the bearing cartridge comprises a recessed annular region.

11. The rotating assembly of claim 10 wherein the anisotropic member comprises a position at least partially in the recessed annular region.

12. The rotating assembly of claim 1 wherein the outer race of the bearing cartridge comprises at least one lubricant jet aperture.

13. The rotating assembly of claim 1 wherein the outer race of the bearing cartridge comprises a unitary outer race.

14. The rotating assembly of claim 1 wherein the inner race of the bearing cartridge comprises a multi-piece inner race.

15. The rotating assembly of claim 1 wherein the rolling elements comprise balls.

16. The rotating assembly of claim 1 wherein the rolling elements comprise a set of turbine side rolling elements and a set of compressor side rolling elements.

17. The rotating assembly of claim 1 further comprising at least one seal ring positioned in the through bore between the outer race of the bearing cartridge and a surface of the center housing wherein the surface defines at least part of the through bore of the center housing.

18. The rotating assembly of claim 1 wherein the anisotropic member comprises inner spacers and outer spacers.

19. The rotating assembly of claim 1 wherein the anisotropic member comprises a first segment having a first axial width and a second segment having a second axial width and wherein the first axial width differs from the second axial width.

20. A rotating assembly for a turbocharger comprising:
    a center housing that comprises a through bore having a central axis;
    a bearing cartridge positioned in the through bore wherein the bearing cartridge comprises an outer race, an inner race and rolling elements disposed between the inner race and the outer race;
    two anisotropic members positioned in the through bore between the outer race of the bearing cartridge and a surface of the center housing wherein the surface defines at least part of the through bore of the center housing; and a shaft rotatably supported in the center housing by the bearing cartridge wherein the inner race is mounted on the shaft and the shaft is connected at one end to a compressor wheel and at another end to a turbine wheel.

21. The rotating assembly of claim 20 wherein each of the two anisotropic members comprises a ring and a series of lobes arranged about the ring.

22. The rotating assembly of claim 20 wherein the outer race of the bearing cartridge comprises two recessed annular regions and wherein each of the two anisotropic members comprises a position at least partially in one of the two recessed annular regions.

23. A rotating assembly for a turbocharger comprising:
a center housing that comprises a through bore having a central axis;
a bearing cartridge positioned in the through bore wherein the bearing cartridge comprises an outer race, an inner race and rolling elements disposed between the inner race and the outer race and wherein the outer race of the bearing cartridge comprises a recessed annular region;
an anisotropic member positioned in the through bore between the outer race of the bearing cartridge and a surface of the center housing wherein the surface defines at least part of the through bore of the center housing and wherein the anisotropic member comprises a position at least partially in the recessed annular region; and
a shaft rotatably supported in the center housing by the bearing cartridge wherein the inner race is mounted on the shaft and the shaft is connected at one end to a compressor wheel and at another end to a turbine wheel.

\* \* \* \* \*